(12) United States Patent
Charters et al.

(10) Patent No.: US 7,389,350 B2
(45) Date of Patent: Jun. 17, 2008

(54) METHOD, APPARATUS AND COMPUTER PROGRAM PRODUCT FOR INTEGRATING HETEROGENEOUS SYSTEMS

(75) Inventors: Graham Castree Charters, Southampton (GB); Amanda Elizabeth Chessell, Alton (GB)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 09/683,902

(22) Filed: Feb. 28, 2002

(65) Prior Publication Data

US 2002/0147961 A1  Oct. 10, 2002

(30) Foreign Application Priority Data

Mar. 5, 2001 (GB) ................. 0105284.4

(51) Int. Cl.
*G06F 15/16* (2006.01)
(52) U.S. Cl. ...................... 709/227; 709/228
(58) Field of Classification Search ............... 709/226, 709/227, 228; 370/230, 231, 395.21
See application file for complete search history.

(56) References Cited

U.S. PATENT DOCUMENTS

| | | | |
|---|---|---|---|
| 6,154,778 A * | 11/2000 | Koistinen et al. ........... | 709/228 |
| 6,243,396 B1 * | 6/2001 | Somers ....................... | 370/469 |
| 6,252,857 B1 * | 6/2001 | Fendick et al. ............. | 370/254 |
| 6,404,738 B1 * | 6/2002 | Reininger et al. .......... | 370/236 |
| 6,446,125 B1 * | 9/2002 | Huang et al. ............... | 709/226 |
| 6,708,209 B1 * | 3/2004 | Ebata et al. ................ | 709/223 |
| 6,845,389 B1 * | 1/2005 | Sen et al. ................... | 709/204 |
| 2002/0093936 A1 * | 7/2002 | Chuah ........................ | 370/349 |

FOREIGN PATENT DOCUMENTS

| | | |
|---|---|---|
| EP | 0774878 A2 | 5/1997 |
| EP | 1043869 A2 * | 10/2000 |
| EP | 1158740 A1 | 11/2001 |

OTHER PUBLICATIONS

Koistinen et al., "Worth-based multi-category quality-of-service negotiation in distributed object infrastructures", Enterprise Distributed Object Computing Workshop, 1998. p. 239-249. EDOC '98. Proceedings. Second International, Nov. 3-5, 1998.*

IEEE 2000, MILCOM 2000, 21st Century Military Communications Conference Proceedings, "A New Approach For Providing Quality-Of-Service In A Dynamic Network Environment", M. Mirhakkak, et al., vol. 2, pp. 1020-1025, The MITRE Corporation, Network And Communications Engineering Dept., Reston, VA, 2000.

(Continued)

*Primary Examiner*—William Vaughn
*Assistant Examiner*—Joseph Maniwang
(74) *Attorney, Agent, or Firm*—Ference & Associates LLC

(57) ABSTRACT

Disclosed are a method, computer program product and apparatus for integrating resource and coordinator components in a heterogeneous computer system. The technique disclosed involves the introduction of a negotiation phase into the resource enlistment or registration process wherein the resource component and coordinator component request and respond with indicators showing the quality of service that each supports, thus jointly establishing at runtime a quality of service to be supported for the resource and coordinator pairing. The qualities of service may include commit phase support and recovery support.

18 Claims, 6 Drawing Sheets

OTHER PUBLICATIONS

Information Networking, 1998 (ICOIN-12), "QoS-Based Flexibility In Distributed Systems", T. Kanezuka and M. Takizawa, pp. 104-109, Dept. of Computers And Systems Engineering, Tokyo Denki University.

IEEE 1996, Multimedia Database Management Systems, 1996, Proceedings Of International Workshop, "Fault Avoidance And Recovery For Distributed Multimedia Multicast", Ya Xu, et al., pp. 168-174.

INFOCOM '94, Networking For Global Communications, 13th Proceedings, IEEE, Jun. 12-16, 1994, "Dynamic Connection Management For Call-Level QOS Guarantee In Integrated Communication Networks", W.C. Lee and M.G. Hluchyj, vol. 3, pp. 1073-1082, Motorola Codex, Mansfield, MA.

Jim Gray, Digital Equipment Corp., Andreas Reuter, University of Stuttgart, "Transaction Processing: Concepts and Techniques", pp. 6-7, Morgan Kaufmann Publishers Inc., San Mateo, CA,1994.

Ahmed K. Elmagarmid, "Database Transaction Models For Advanced Applications", pp. 35-44, Morgan Kaufmann Publishers Inc., San Mateo, CA, 1995.

Sushil Jajodia and Larry Kerschberg, George Mason University, Fairfax, VA,"Advanced Transaction Models And Architectures", pp. 28-34, Kluwer Academic Publishers, Norwell, MA, 1997.

T.P. Barzailai, "Design and implementation of an RSVP-vased quality of service architecture for an integrated services internet", *IEEE Journal on Selected Areas in Communications*, 1998, see e.g., Para 3.

* cited by examiner

METHOD, APPARATUS AND COMPUTER PROGRAM PRODUCT FOR INTEGRATING HETEROGENEOUS SYSTEMS

BACKGROUND OF INVENTION

1. Field of the Invention

This invention relates to the field of integration of enterprise applications and systems, and more particularly to the integration of heterogeneous systems in which support for qualities of service, such as synchronization and recovery, may be required by some subsystems, and provided or not provided by other subsystems.

2. Background of the Invention

Enterprise Application Integration (EAI) is key to many companies" business strategies. The ability to integrate existing systems with new systems is seen as an essential in, for example, web-enabling existing applications. A fundamental part of EAI is the ability to coordinate updates made to disparate systems that form part of an enterprise information system. For example, a new application, running on an application server, which brings together in an enterprise information system two existing database applications and an Enterprise Resource Planning, or ERP, system (for example, SAP R/3) needs to be able to coordinate updates made to those three systems. The inability to do so could result in loss of data integrity.

The technology, which provides the access to the systems and the integration with the application server, is often referred to as Connectors. Connector coordination can be provided through two interfaces, the coordinator and the resource. Resources can represent Enterprise Information Systems, as shown in FIG. 2. An Enterprise Information System may comprise databases, ERP systems, and the like. The Resources require certain Quality of Service commitments from their environments (via the Coordinator). ("Quality of Service" is used here to refer to such characteristics of systems as their level of support for recoverability of data after a system failure. Some systems provide full recovery support, while others do not. Other such characteristics are, for example, the ability or otherwise to support asynchronous processing.) The use of coordinator and resource interfaces is found in transaction services such as that provided by the Object Management Group's (OMG) CORBA specification, known as the Object Transaction Service (OTS). In general with such services, the implementation of both the resource and the coordinator is provided by the same organization. This means that the Quality of Service (QOS) required and provided by each is known from the beginning.

EAI introduces a new dimension of difficulty which is unavoidable due to the large numbers of heterogeneous systems which need to be integrated, and the large number of application servers which need to provide integration. A significant problem is that the implementers of the coordinator or coordinators and the implementers of the resource or resources may be different organizations whose members may never have met or communicated. In an attempt to overcome the differences between systems supplied by different vendors, the J2EE Connector Architecture specification allows a resource adapter to describe a resource's capabilities in a deployment descriptor, but the application server and the coordinator are required to support all possible options, which is cumbersome for some lightweight runtimes.

Measures of QOS for coordinators and resources include commit phase support (also known as sync level support), which may be one phase commit or two phase commit, and recovery support (that is, whether or not logging is supported to preserve integrity beyond a system crash).

The ways in which these QOS are provided, and the QOS resulting from different coordinator and resource pairings can vary greatly, and some pairings may be invalid. The provision of commit phase support and recovery support is essential in systems which have a characteristic known as "transactionality".

The term "transactionality" is used in the field of data processing to refer to the characteristic of a piece of data processing work that may be defined as having a necessary unity. For example, the data processing task of processing a cash withdrawal from an automated teller machine has several elements, but all must take place for the transaction to be completed. The user's identity must be verified, the cash must be issued, and the user's account must be updated to reflect the new balance after the withdrawal, and so on. If the machine runs out of cash or suffers some other failure, so that the withdrawal does not take place, the user's account must not be updated, or, if it has already been updated before the point of failure, the update must be cancelled so that the account returns to its previous state. For background information on the properties of transactions, see Transaction Processing: Concepts and Techniques, J. Gray and A. Reuter.

Clearly, however, there exist more complex business environments requiring characteristics other than those of this simple, unitary transaction model, and these are the subject of continuing study and research. For background information on more complex transaction environments, see Database Transaction Models, Ahmed K. Elmagarmid, ed., and Advanced Transaction Models and Architectures, Jajodia and Kerschberg, eds. Examples taken from real life include, for example, the booking of a vacation, which may involve multiple transactions to book flights and hire cars, reserve hotel rooms, and so on, using a number of different systems independently developed by different suppliers. The management of transactions and coordination of updates in such environments adds to the complexity of the problems faced by application developers, and the cumbersome nature of existing solutions is unacceptable in environments in which performance is critical.

SUMMARY OF INVENTION

The present invention accordingly provides, in a first aspect, a method for integrating heterogeneous processing systems, the method comprising the steps of:

requesting by a first one of a resource component and coordinator pair a first indicator indicating a first quality of service supported by a second one of the pair; responding by the second one of the pair with the first indicator; receiving by the first one of the pair the first indicator; responsive to the first indicator, determining by the first one of the pair whether the first quality of service is acceptable; responsive to the determining, offering by the first one of the pair to permit one of joining in coordination with the second one of the pair and not joining in coordination with the second of the pair; responsive to the offering by the first one of the pair to permit joining in coordination with the second one of the pair, requesting by the second one of the pair a second indicator indicating a second quality of service acceptable to the first one of the pair; responding by the first one of the pair with the second indicator; receiving by the second one of the pair the second indicator; responsive to the second indicator, determining by the second one of the pair to permit joining in coordination with the first one of the pair; and responsive to determining by the second one of the pair to permit joining in coordination with the first one of the pair, determining a quality of service provision for the coordination.

In a second aspect, the present invention provides a computer program product comprising computer program code tangibly embodied in a signal bearing medium, the computer program code comprising instructions to, when loaded into a computer system and executed, cause the computer to perform the steps of: requesting by a first one of a resource component and coordinator pair a first indicator indicating a first quality of service supported by a second one of the pair; responding by the second one of the pair with the first indicator; receiving by the first one of the pair the first indicator; responsive to the first indicator, determining by the first one of the pair whether the first quality of service is acceptable; responsive to the determining, offering by the first one of the pair to permit one of joining in coordination with the second one of the pair and not joining in coordination with the second of the pair; responsive to the offering by the first one of the pair to permit joining in coordination with the second one of the pair, requesting by the second one of the pair a second indicator indicating a second quality of service acceptable to the first one of the pair; responding by the first one of the pair with the second indicator; receiving by the second one of the pair the second indicator; responsive to the second indicator, determining by the second one of the pair to permit joining in coordination with the first one of the pair; and responsive to determining by the second one of the pair to permit joining in coordination with the first one of the pair, determining a quality of service provision for the coordination.

In a third aspect, the present invention provides apparatus for integrating heterogeneous processing systems, the apparatus comprising: a first requestor for requesting by a first one of a resource component and coordinator pair a first indicator indicating a first quality of service supported by a second one of the pair; a first responder for responding by the second one of the pair with the first indicator; a receiver for receiving by the first one of the pair the first indicator; a determining element being responsive to the first indicator, for determining by the first one of the pair whether the first quality of service is acceptable; an offering element being responsive to the determining, for offering by the first one of the pair to permit one of joining in coordination with the second one of the pair and not joining in coordination with the second of the pair; a second requestor being responsive to the offering by the first one of the pair to permit joining in coordination with the second one of the pair, for requesting by the second one of the pair a second indicator indicating a second quality of service acceptable to the first one of the pair; a second responder for responding by the first one of the pair with the second indicator; a second receiver for receiving by the second one of the pair the second indicator; a second determining element being responsive to the second indicator, for determining by the second one of the pair to permit joining in coordination with the first one of the pair; and a third determining element being responsive to determining by the second one of the pair to permit joining in coordination with the first one of the pair, for determining a quality of service provision for the coordination.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

Preferred embodiments of the present invention will now be described by way of example only, with reference to the accompanying drawings.

DETAILED DESCRIPTION

Figure 1:
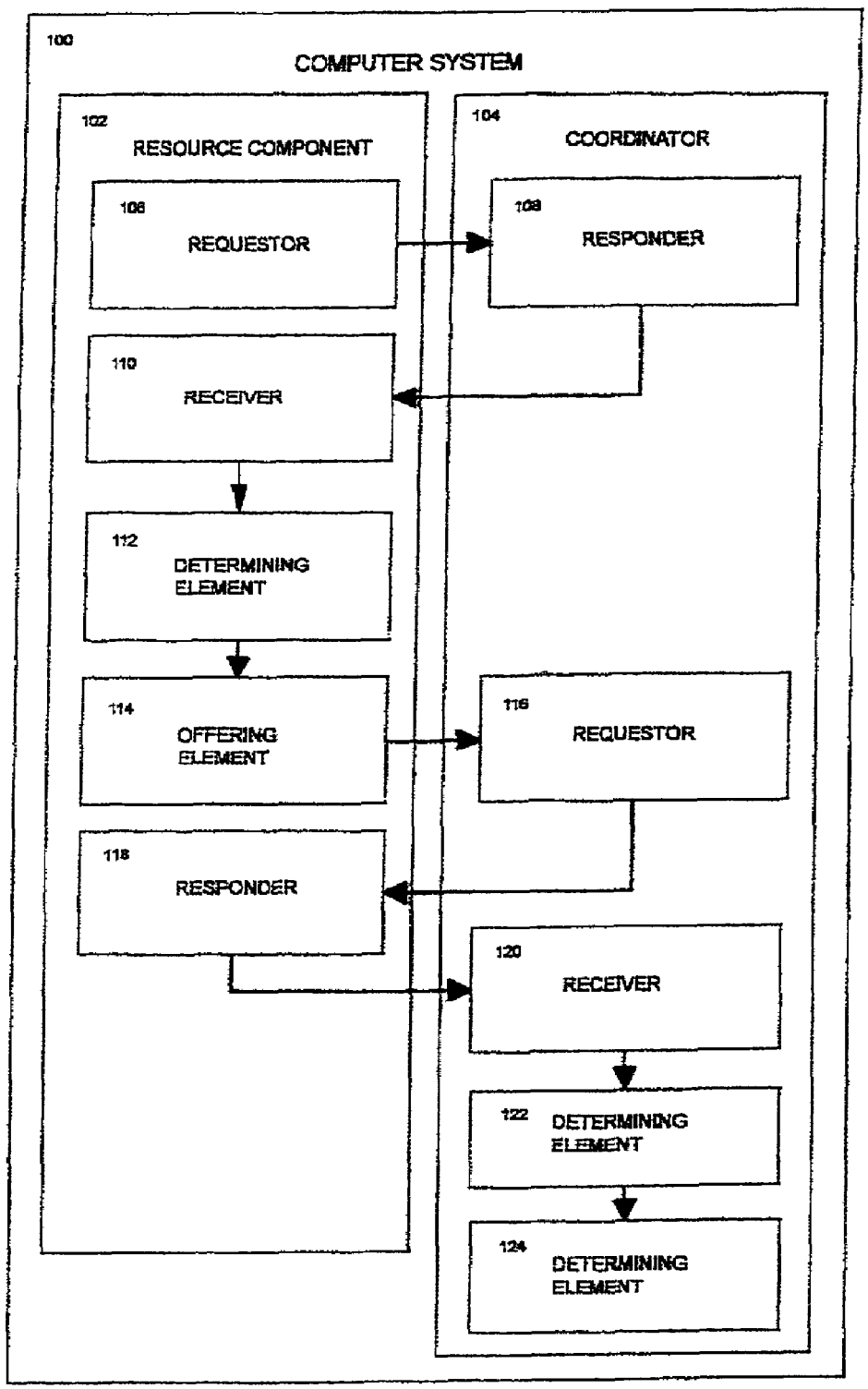
FIG. 1 shows a computer system according to a preferred embodiment of the present invention.

Preferably, said first one of said pair comprises a resource component and said second one of said pair comprises a coordinator.

Preferably, said resource component comprises a resource manager.

Preferably, said resource component comprises a resource adapter.

Preferably, a resource manager of the first aspect comprises a database manager.

Preferably, said resource manager comprises an Enterprise Resource Planning system.

Preferably, said coordinator comprises a transaction manager.

Preferably, said first one of said pair comprises a coordinator and said second one of said pair comprises a resource component.

Preferably, said resource component comprises a resource manager.

Preferably, said resource component comprises a resource adapter.

Preferably, said resource manager comprises a database manager.

Preferably, said resource manager comprises an Enterprise Resource Planning system.

A method according to the first aspect may be performed at startup of a server.

A method performed at the startup of a server preferably comprises the prior step of: sending, by said server, a request to a first one of a resource and coordinator pair to initiate requesting said first indicator indicating a quality of service supported by a second one of resource and coordinator pairs.

Preferably, at least one of said first and said second qualities of service comprises a commit phase support.

Further preferably, said commit phase support comprises at least one of one phase commit support and two phase commit support.

Preferably, at least one of said first and said second qualities of service comprises recovery support.

Preferably, at least one of said resource component and coordinator pair comprises a platform-independent program code component.

Preferably, a quality of service provision is renegotiated.

Preferred features of the second aspect comprise program elements to perform steps corresponding to the preferred steps of the method of the first aspect.

Preferred features of the third aspect comprise means in the apparatus to perform actions corresponding to the preferred steps of the method of the first aspect.

The present invention thus provides for a negotiation phase between a coordinator and a resource. It does not mandate one particular way of performing this negotiation. One skilled in the art will clearly see that there are a number of possible implementations, with the steps of the negotiation being carried out in sequences other than that described in the preferred embodiment.

Advantageously, in the present invention neither the coordinator nor the resource has sole responsibility for determining whether a particular resource can be coordinated by a particular coordinator. The decision is made by mutual agreement.

The use of a negotiation phase according to the present invention thus advantageously allows more flexibility and the ability for the coordinator and resource to agree on the Quality of Service the pairing can provide, allowing for runtime environments in which not all qualities of service need to be allowed for, and thereby permitting the use of smaller, less resource-consuming runtimes.

Preferred embodiments of the present invention may be implemented in apparatus as shown in FIG. 1, in which a computer system (100) comprises a resource component (102) and a coordinator (104). Resource component (102) comprises a requester element (106) for requesting a QOS supported indicator from the coordinator (104). Coordinator (104) comprises a responder element (108) for responding with a QOS supported indicator. Resource component (102) further comprises a receiving element (110) which receives the QOS supported indicator, and a determining element (112) for determining whether or not the QOS indicator is such that the resource component (102) should offer to be coordinated by the coordinator (104). Resource component (102) further comprises an offering element (114) for offering to be coordinated by the coordinator (104). Coordinator (104) further comprises a requester element (116) for requesting, in response to an offer, a QOS supported indicator from resource component (102). Resource component (102) additionally comprises a responder element (118) for responding with a QOS supported indicator. Coordinator (104) comprises a receiver element (120) for receiving a QOS supported indicator from resource component (102), and a determining element (122) for determining whether or not the QOS supported indicator is such that coordinator (104) should agree to coordinate resource component (102). Finally, coordinator (104) comprises a determining element (124) for determining the QOS provision that is required to coordinate the resource component (102). In an alternative embodiment, the elements and components shown in the resource component (102) and the elements and components in the coordinator (104) may be arranged the other way round from that shown in the exemplary drawing in FIG. 1, so that, for example, it is a requester element in the coordinator that initiates the exchange of flows, and the exchange of flows continues with a response from a responder element in the resource component, and so on to the end of the negotiation.

It will be clear that the embodiment as shown in FIG. 1 is simplified for ease of understanding, and that any combinations of computer systems in networks may equally be used in implementing the resource and coordinator components having the features of the preferred embodiments of the present invention. Clearly, too, in such environments, various of the elements of the coordinators and resources may themselves be distributed across multiple computer systems. It will also be clear that there are a number of possible implementations wherein the steps of the negotiation are carried out in sequences other than that described in the preferred embodiment. The negotiation steps of providing an indicator and requesting an indicator might, for example, be combined in a single message to reduce the number of flows across a network, and the negotiation may be initiated by either the resource, the coordinator, or a "third party".

In the preferred embodiments of the present invention, agreement between a resource and a coordinator is achieved in a minimum of two stages:

1. The resource queries the coordinator for any relevant information it needs in order to make its decision (coordinator QOS information). For example, if the resource supports two phase commit, and recovery, then it queries the coordinator, through known methods on the coordinator interface, as to whether it supports two phase commit and recovery. It uses the information it gets back to determine whether it will offer itself to the coordinator for coordination.

2. When the resource is offered to the coordinator, the Coordinator queries the resource to determine what level of support the resource provides (resource QOS information). The coordinator uses this information to decide whether to allow the resource to be coordinated, and, if so, how. This decision can then be fed back to the application server in the form of an information or warning message stating what QOS the resource and coordinator pairing will provide.

Again, it will be readily apparent to one skilled in the art that the negotiation between the resource and the coordinator may equally well be carried out the other way round.

A Quality of Service table can be used to represent the possible contracts for coordinator and resource pairings. These contracts are matched up to determine the resulting QOS at runtime. Below is an example of a QOS table showing the resulting QOS achieved when matching different coordinator and resource QOS. The example shown is only intended to demonstrate such a table. Tables may differ depending on what assumptions are made. A "-" means that the value is irrelevant to the resulting QOS. "Bracketing" means that the resources are told when to commit or rollback, but do not vote on the decision. "Distributed Bracketing" means the resources are able to vote on the outcome, and therefore the decision is distributed. "Atomic Transaction" means that there is no voting, but there is recovery. "Distributed Atomic Transaction" means that all the resources vote on the outcome, and can be recovered.

| Coordinator | | Resource | | Number of | |
|---|---|---|---|---|---|
| Phase | Recovery | Phase | Recovery | Resources | Quality of Service |
| 1 | No | — | — | 1 | Bracketing |
| — | — | 1 | No | 1 | Bracketing |
| — | No | 1 | — | 1 | Bracketing |
| 1 | — | — | No | 1 | Bracketing |
| 1 | — | — | — | >1 | Bracketing |
| — | — | 1 | — | >1 | Bracketing |
| 2 | No | 2 | — | — | Distributed Bracketing |
| 2 | — | 2 | No | — | Distributed Bracketing |
| 1 | Yes | — | Yes | 1 | Atomic Transaction |

-continued

| Coordinator Phase | Coordinator Recovery | Resource Phase | Resource Recovery | Number of Resources | Quality of Service |
|---|---|---|---|---|---|
| — | Yes | 1 | Yes | 1 | Atomic Transaction |
| 2 | Yes | 2 | Yes | — | Distributed Atomic Transaction |

The following assumptions were made in the creation of this table:

1. A two phase capable resource or coordinator can use one phase when there is only one resource registered (OTS behaves in this way).
2. There is no Last Agent Optimization (this technique permits a single one phase capable resource to be part of a distributed transaction).
3. A one phase capable resource can register with a two phase capable coordinator and a two phase capable resource can register with a one phase capable coordinator.

It will be clear to one skilled in the art that these assumptions may vary, depending on the nature of the heterogeneous systems that are participating in the overall data processing task.

Figure 2:
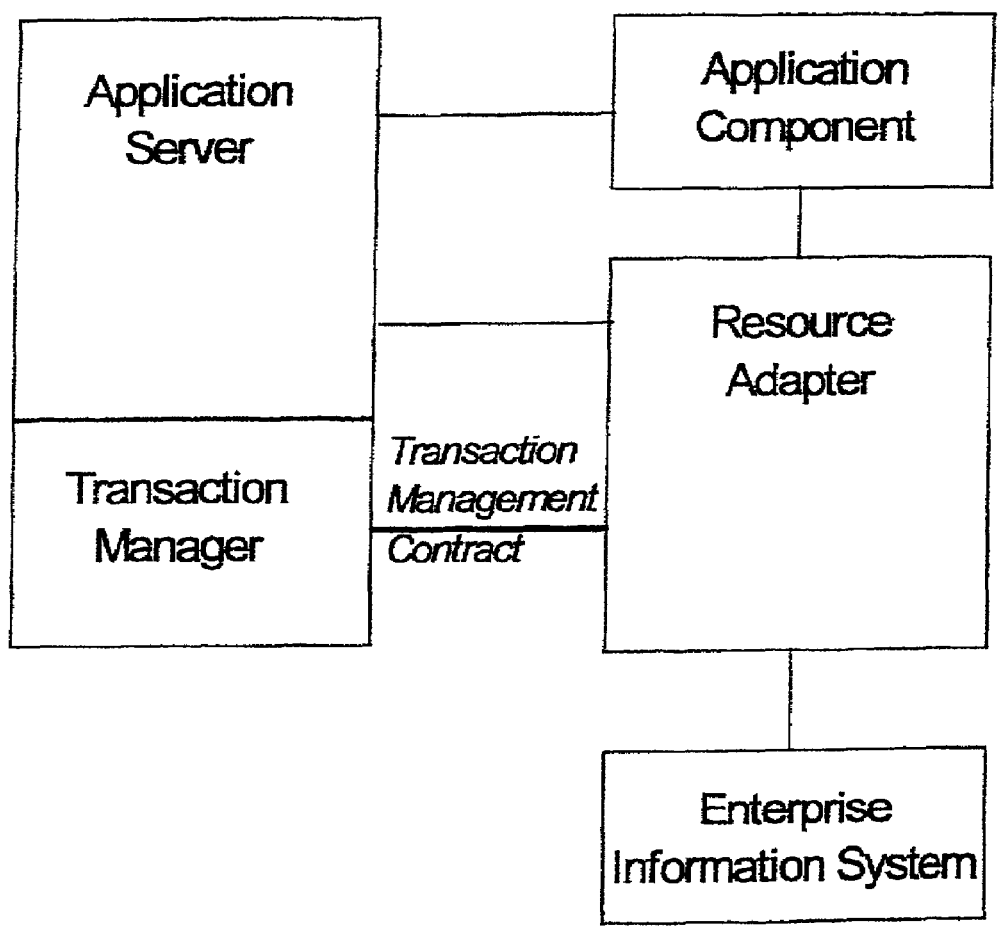
FIG. 2 shows the architecture of the prior art as described in the J2EE Connector Architecture specification.

In FIG. 2 is shown a typical configuration of elements comprising a prior art system as defined in the J2EE specification, in which a transaction contract exists between a transaction manager (which represents one possible embodiment of a coordinator) and a resource adapter.

Figure 3:
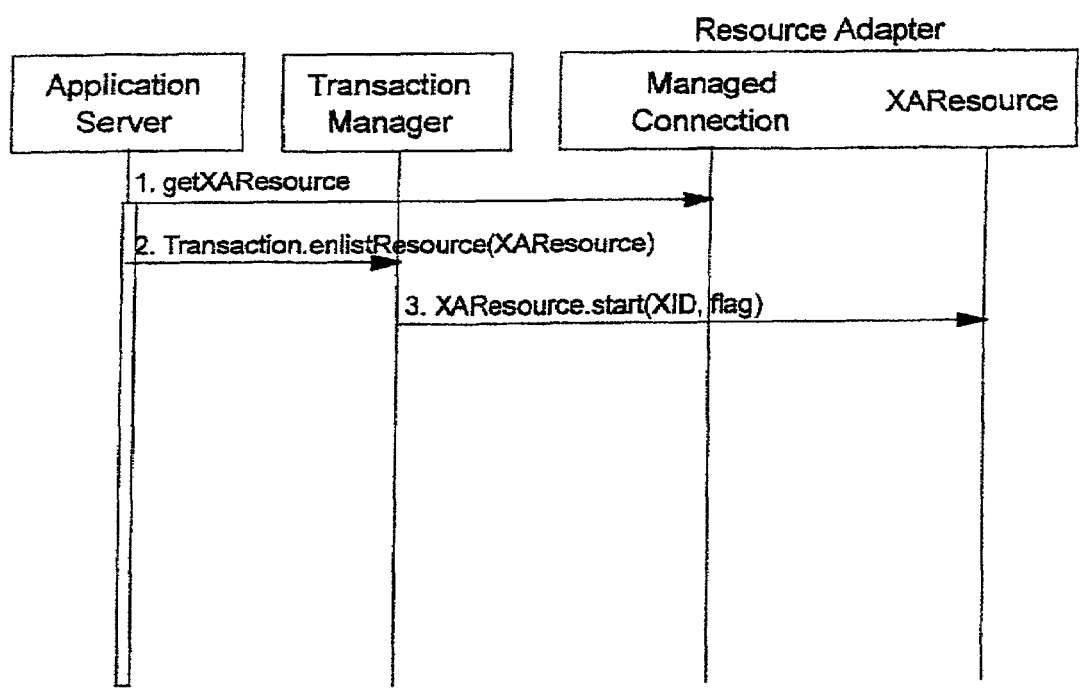
FIG. 3 shows the enlisting of a resource for it to participate in a transaction as defined in the prior art J2EE specification.

The process by which a resource is enlisted in a system of the prior art defined in the J2EE specification is shown in FIG. 3. At Step 1, an application server issues a getXAResource call to the managed connection of the resource adapter. At Step 2, the application server issues a Transaction.enlistResource resource call to the transaction manager. At Step 3, the transaction manager issues an XAResource.start call to the XAResource.

Figure 4:
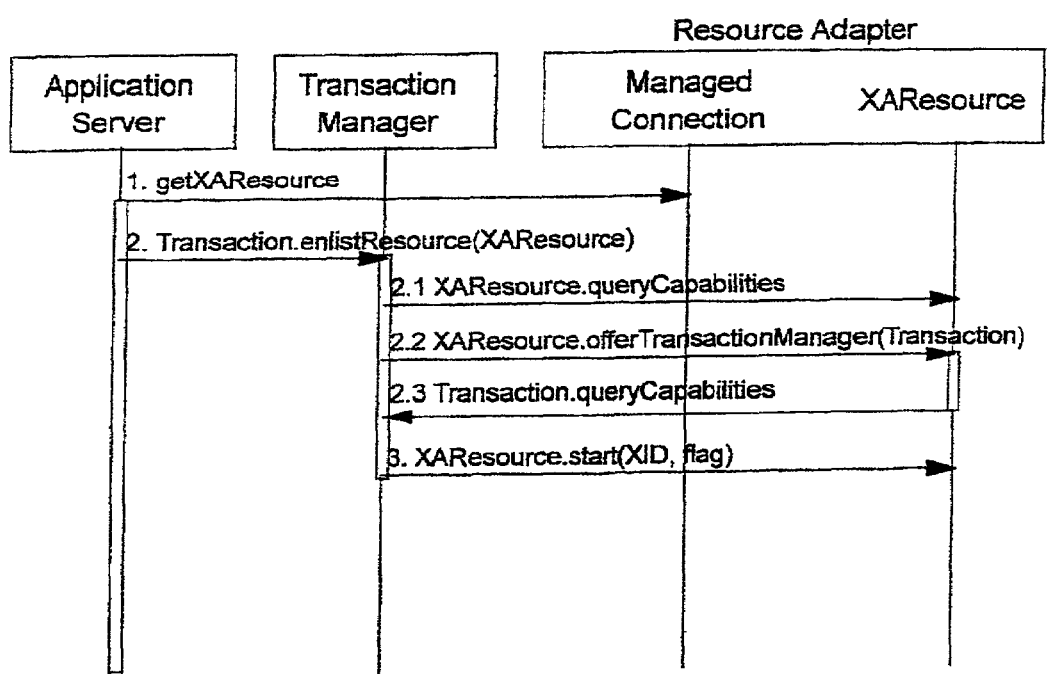
FIG. 4 shows an augmentation of the J2EE enlistment process according to a first preferred embodiment of the present invention.

In a first preferred embodiment of the present invention, as shown in FIG. 4, an additional negotiation phase has been inserted between Steps 2 and 3 of the enlistment process.

Steps 2.1-2.3 are the additional calls created for this negotiation phase. During the enlist, the transaction manager requests the capabilities from the XAResource (the queryCapabilities call). The details of how the capabilities that are returned are specified is not part of the subject matter of the present invention, but they may implement any interface which allows the resource to describe all its capabilities, such as one or two phase commit, recovery, etc. One skilled in the art will readily understand that there may be various detailed implementations of such an interface, and that the capabilities listed above (commit support and recovery support) are given as examples rather than being intended as an exhaustive list. The transaction manager decides, based on the returned capabilities, whether it is capable of coordinating the XAResource. If it is capable then it continues on to step 2.2. If not it returns a failure from the enlistResource call.

In step 2.2, the transaction manager offers itself to the XAResource thus permitting the resource to communicate with the transaction manager. In step 2.3, the XAResource queries the transaction manager's capabilities. As with the capabilities of the XAResource, the details of how they are specified is not part of the subject matter of the present invention, but it may implement the same, or a similar, specified interface which allows the transaction manager to describe all its capabilities, such as one or two phase commit, recovery, etc. Again, these capabilities are intended as examples only, and one skilled in the art will readily perceive that information about other capabilities may also be included in the interface. The XAResource decides, based on the returned capabilities, whether it believes it should be coordinated by the transaction manager. If it is satisfied then it returns an "acceptance" from the offerTransactionManager (which may just be a non-error return). If not it returns a "rejection" from the offerTransactionManager call (which could be in the form of an exception). This rejection is then mapped to a failure from the enlistResource call. One skilled in the art will readily understand that the return messages may alternatively take the form of more detailed informational messages, and that it is envisioned that further negotiation steps may be added where, for example, a "secondbest-fit" might be acceptable to the resource and coordinator pair.

Figure 5:
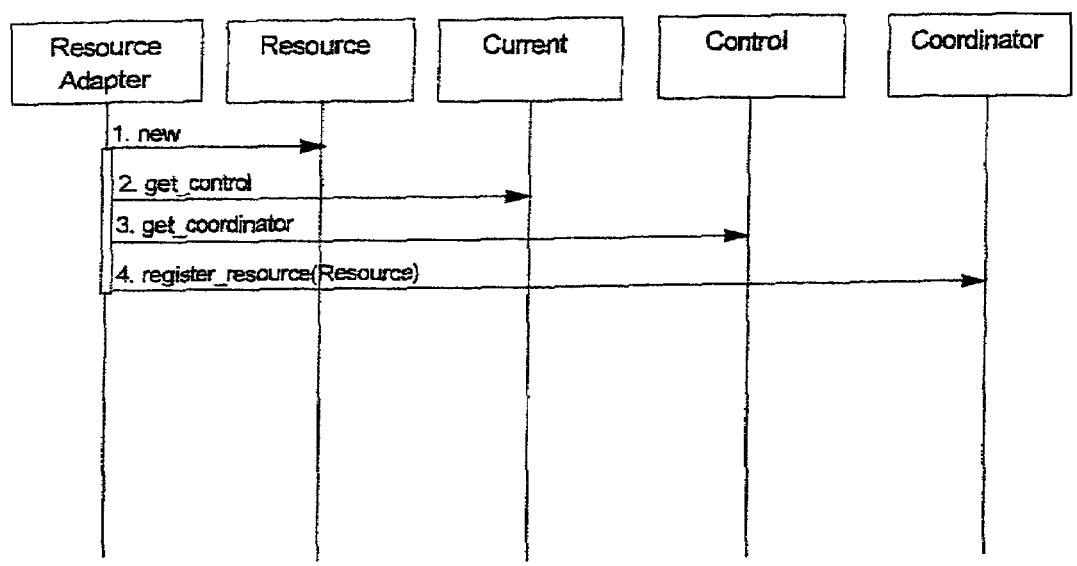
FIG. 5 shows how a resource becomes registered with a coordinator as defined by the prior art CORBA Object Transaction Service (OTS).

FIG. 5 shows the prior art process by which a resource is registered with a coordinator as defined in the OTS specification. In Step 1, a resource adapter issues a "new" call to a resource. In Step 2, the resource adapter issues "get_control", and at Step 3, "get_coordinator". The resource adapter is now in communication with the coordinator, and at Step 4, it issues "register_resource".

Figure 6:
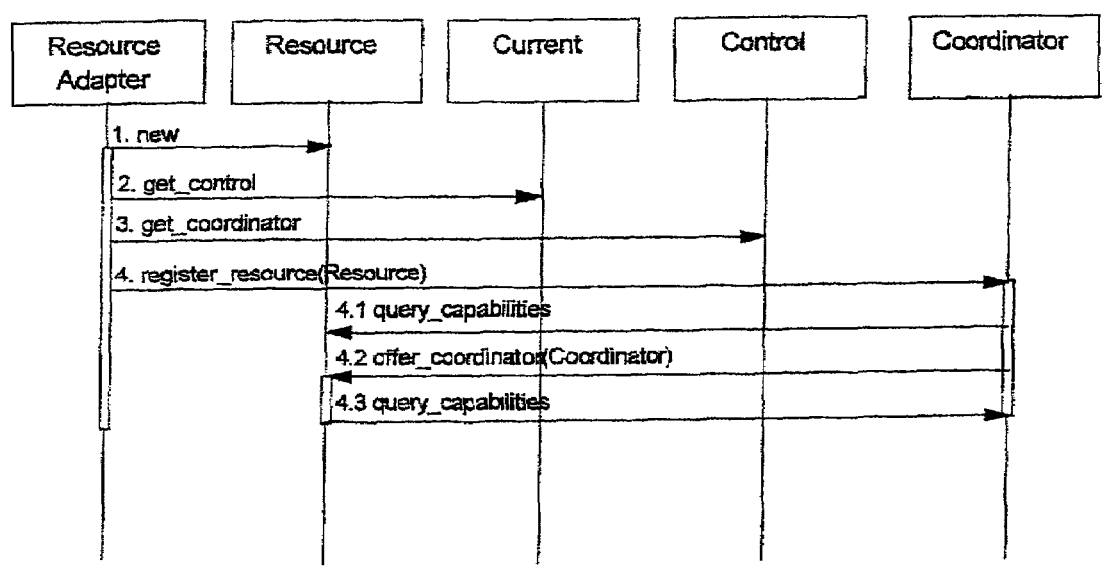
FIG. 6 shows an augmentation of the OTS resource registering process according to a second preferred embodiment of the present invention.

In a second preferred embodiment of the present invention, shown in FIG. 6, Steps 4.1-4.3 show an example of the additional calls required to implement the negotiation technique in an OTS environment.

In both the first and the second preferred embodiments, the negotiation is performed between the resource and the coordinator (or transaction manager). One will readily perceive that this negotiation could equally well be performed between the resource adapter and the coordinator. However, this embodiment would require the specification of wholly new interfaces rather than the augmentation of existing interfaces, and is therefore less preferred.

A further alternative embodiment of the present invention would be to have the negotiation phase performed at server startup. In this alternative embodiment, the server would initiate the negotiation between the transaction manager and all the deployed resources or resource adapters.

The present invention is preferably embodied as a computer program product for use with a computer system. Such an implementation may comprise a series of computer readable instructions either fixed on a tangible medium, such as a computer readable medium, e.g., diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

It will be appreciated that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

The invention claimed is:

1. A method for integrating heterogeneous processing systems, said method comprising the steps of:
    requesting by a first one of a resource component and coordinator pair a first indicator indicating a first quality of service supported by a second one of said pair, said first one and said second one of said pair disposed within different heterogeneous processing systems, wherein said first one of said pair comprises a resource component and said second one of said pair comprises a coordinator;
    responding by said second one of said pair with said first indicator;
    receiving by said first one of said pair said first indicator;
    responsive to said first indicator, determining by said first one of said pair whether said first quality of service is acceptable;
    responsive to said determining, offering by said first one of said pair to permit one of joining in coordination with said second one of said pair and not joining in coordination with said second of said pair;
    responsive to said offering by said first one of said pair to permit joining in coordination with said second one of said pair, requesting by said second one of said pair a second indicator indicating a second quality of service acceptable to said first one of said pair;
    responding by said first one of said pair with said second indicator;
    receiving by said second one of said pair said second indicator;
    responsive to said second indicator, determining by said second one of said pair to permit joining in coordination with said first one of said pair; and
    responsive to determining by said second one of said pair to permit joining in coordination with said first one of said pair, determining a quality of service provision for said coordination.

2. A method as claimed in claim 1, further comprising the step of having said resource component comprise a resource manager.

3. A method as claimed in claim 1, further comprising the step of having said resource component comprise a resource adapter.

4. A method as claimed in claim 2, further comprising the step of having said resource manager comprise a database manager.

5. A method as claimed in claim 2, further comprising the step of having said resource manager comprise an Enterprise Resource planning system.

6. A method claimed in claim 1, further comprising the step of having said coordinator comprise a transaction manager.

7. A method as claimed in claim 1, further comprising the step of having said first one of said pair comprise a coordinator and said second one of said pair comprise a resource component.

8. A method as claimed in claim 7, further comprising the step of having said resource component comprise a resource manager.

9. A method as claimed in claim 7, further comprising the step of having said resource component comprise a resource adapter.

10. A method as claimed in claim 8, further comprising the step of having said resource manager comprise a database manager.

11. A method as claimed in claim 8, further comprising the step of having said resource manager comprise an Enterprise Resource planning system.

12. A method as claimed in claim 1, further comprising the step of performing the previous steps at startup of a server.

13. A method as claimed in claim 12, further comprising the step of:
    sending, by said server, a request to a first one of a resource and coordinator pair to initiate requesting said first indicator indicating a quality of service supported by a second one of resource and coordinator pairs.

14. A method as claimed in claim 1, further comprising the step of having at least one of said first and second qualities of service comprise a commit phase support.

15. A method as claimed in claim 14, further comprising the step of having said commit phase support comprise at least one of one phase commit support and two phase commit support.

16. A method as claimed in claim 1, further comprising the step of having at least one of said first and second qualities of service comprise recovery support.

17. A method as claimed in claim 1, further comprising the step of having at least one of said resource component and coordinator pair comprise a platform-independent program code component.

18. A method as claimed in claim 1, further comprising the step of renegotiating a quality of service provision.

* * * * *